(12) United States Patent
Rakshit et al.

(10) Patent No.: US 10,705,730 B2
(45) Date of Patent: Jul. 7, 2020

(54) DISPLAY OF A VIRTUAL KEYBOARD ON A SUPPLEMENTAL PHYSICAL DISPLAY PLANE SURROUNDING A PRIMARY PHYSICAL DISPLAY PLANE ON A WEARABLE MOBILE DEVICE

(71) Applicant: INTERNATIONAL BUSINESS MACHINES CORPORATION, Armonk, NY (US)

(72) Inventors: Sarbajit K. Rakshit, Kolkata (IN); Mukundan Sundararajan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 333 days.

(21) Appl. No.: 15/414,202

(22) Filed: Jan. 24, 2017

(65) Prior Publication Data
US 2018/0210644 A1 Jul. 26, 2018

(51) Int. Cl.
*G06F 3/0488* (2013.01)
*G06T 11/60* (2006.01)
(Continued)

(52) U.S. Cl.
CPC ......... *G06F 3/04886* (2013.01); *G04G 9/007* (2013.01); *G04G 17/045* (2013.01);
(Continued)

(58) Field of Classification Search
CPC .............................. G06F 3/04886; G06F 1/163
See application file for complete search history.

(56) References Cited

U.S. PATENT DOCUMENTS 9,471,203 B1 10/2016 O'Dell, III et al.
2011/0047459 A1* 2/2011 Van Der Westhuizen ...................
G06F 1/1692
715/702

(Continued)

FOREIGN PATENT DOCUMENTS

CN 104461004 A 3/2015

OTHER PUBLICATIONS

"TouchOne Keyboard—The First Dedicated Smartwatch Keyboard", [retrieved on Oct. 7, 2016]. Retrieved from the Internet: <URL: https://www.kickstarter.com/projects/790443497/touchone-keyboard-the-first-dedicated-smartwatch-k>, 2016, 9 pgs.

(Continued)

*Primary Examiner* — Abdullah Al Kawsar
*Assistant Examiner* — Kenny Nguyen
(74) *Attorney, Agent, or Firm* — Michael O'Keefe; Matthew M. Hulihan; Heslin Rothenberg Farley & Mesiti PC

(57) ABSTRACT

Display of supplemental content on a smartwatch wearable mobile device. A method establishes, on supplemental physical display plane(s) of a smartwatch wearable mobile device, virtual display plane(s). The smartwatch includes a primary physical display plane and the supplemental physical display plane(s). The supplemental physical display plane(s) at least partially surround the primary physical display plane. The method displays primary content on the primary physical display plane and supplemental content on the virtual display plane(s). The method also receives touch sensor input from a touch sensor of the smartwatch and maps the touch sensor input to interface element(s) of the supplemental content on the virtual display plane(s). The method selects the interface element(s) based on the mapping the touch sensor input to the interface element.

13 Claims, 7 Drawing Sheets

(51) Int. Cl.
*G06F 1/16* (2006.01)
*G04G 21/08* (2010.01)
*G04G 9/00* (2006.01)
*G04G 17/04* (2006.01)
*G06F 17/27* (2006.01)

(52) U.S. Cl.
CPC ............ *G04G 21/08* (2013.01); *G06F 1/163* (2013.01); *G06F 1/1643* (2013.01); *G06F 1/1652* (2013.01); *G06T 11/60* (2013.01); *G06F 17/276* (2013.01)

(56) References Cited

U.S. PATENT DOCUMENTS

| | | | | |
|---|---|---|---|---|
| 2011/0071818 | A1* | 3/2011 | Jiang | G06F 3/0236 704/8 |
| 2013/0181952 | A1* | 7/2013 | Lin | G06F 3/0418 345/178 |
| 2014/0002419 | A1* | 1/2014 | Thorson | G06F 3/147 345/175 |
| 2014/0250405 | A1* | 9/2014 | Wheeler | G06F 3/0482 715/780 |
| 2014/0289668 | A1* | 9/2014 | Mavrody | G06F 3/04886 715/781 |
| 2015/0095833 | A1 | 4/2015 | Kim et al. | |
| 2015/0121285 | A1 | 4/2015 | Eleftheriou et al. | |
| 2015/0121287 | A1 | 4/2015 | Fermon | |
| 2015/0160856 | A1* | 6/2015 | Jang | G06F 3/04886 715/773 |
| 2015/0363071 | A1* | 12/2015 | Devale | G06F 3/013 715/782 |
| 2016/0026308 | A1* | 1/2016 | Wu | G06F 3/04883 345/173 |
| 2016/0124633 | A1* | 5/2016 | Kim | G06F 1/1643 715/773 |
| 2016/0231772 | A1* | 8/2016 | Huang | G06F 1/163 |
| 2017/0024117 | A1* | 1/2017 | Hong | G06F 3/04883 |
| 2017/0177185 | A1 | 6/2017 | Voutta et al. | |
| 2017/0277136 | A1* | 9/2017 | Minami | G06F 1/3296 |
| 2017/0329499 | A1 | 11/2017 | Rauschenbach et al. | |
| 2017/0329511 | A1* | 11/2017 | Ueno | G06F 3/0488 |
| 2018/0059903 | A1* | 3/2018 | Lim | G06F 3/02 |
| 2018/0124385 | A1* | 5/2018 | Van Beek | H04N 9/12 |

OTHER PUBLICATIONS

Stables, James, "TouchOne Keyboard may actually make smartwatch typing possible", [retrieved on Oct. 7, 2016]. Retrieved from the Internet: <URL: http://www.wareable.com/smartwatches/touchone-keyboard-may-actually-make-smartwatch-typing-possible-1891>, Nov. 2, 2015, 5 pgs.

Ohannessian, Kevin, "This Smartwatch Keyboard Is the Second Coming of T9" [retrieved on Oct. 7, 2016]. Retrieved from the Internet: <URL: http://www.fastcodesign.com/3046742/this-smartwatch-keyboard-is-the-second-coming-of-t9>, Jun. 2, 2015, 18 pgs.

Warren, Tom, "Microsoft's Android Wear keyboard lets you draw letters on your smartwatch", [retrieved Oct. 7, 2016]. Retrived from the Internet: <URL: http://www.theverge.com/2014/10/11/6961447/microsoft-android-wear-keyboard-download-features>, Oct. 11, 2014, 9 pgs.

Smith, Mat, "Minuum's Android Wear keyboard makes smartwatch typing a fidgety reality", [retrieved on Oct. 7, 2016]. Retrieved from the Internet: <URL: http://www.engadget.com/2014/07/16/minuum-android-wear-keyboard/>, Jul. 16, 2014, 10 pgs.

Wood, Chris, "Samsung Wants to Use Your Hand as a Second Display", [retrieved on Oct. 7, 2016]. Retrieved from the Internet: <URL: http://www.gizmag.com/samsung-patent-smartwatch-projector/43335/>, May 16, 2016, 28 pgs.

Mell, Peter, et al., "The NIST Definition of Cloud Computing", NIST Special Publication 800-145, Sep. 2011, Gaithersburg, MD, 7 pgs.

List of IBM Patents or Applications Treated as Related, Oct. 15, 2019, 2 pgs.

"Display of Supplemental Content on a Wearable Mobile Device", U.S. Appl. No. 16/598,478, Filed Oct. 10, 2019, pp. 1-43.).

* cited by examiner

DISPLAY OF A VIRTUAL KEYBOARD ON A SUPPLEMENTAL PHYSICAL DISPLAY PLANE SURROUNDING A PRIMARY PHYSICAL DISPLAY PLANE ON A WEARABLE MOBILE DEVICE

BACKGROUND

The physical dimensions of the display of smartwatches and other wearable mobile devices ("wearables") are generally relatively small. Often times it is difficult to navigate or interact with the content being displayed. For example, using a virtual keyboard displayed on the screen may be difficult because of the key size. Additionally, a virtual keyboard with keys large enough to type accurately may occupy such a large portion of display area that any remaining portions of the display are much too small for any meaningful display of the other content. Thus, since the dimensions of smartwatches and other wearable devices are relatively small, dividing the real estate of the display between a virtual keyboard and content is generally not effective.

SUMMARY

Even with the ability to add larger displays, an upper limit of the display dimension is constrained by the overall dimension of the display. Aspects are described herein that virtually increase the display area to, for example, show supplemental content such as a keyboard in a virtual display area, while enabling ease of interaction with the supplemental content. Shortcomings of the prior art are overcome and additional advantages are provided through the provision of a computer-implemented method. The method establishes, on supplemental physical display plane(s) of a smartwatch wearable mobile device, virtual display plane(s). The smartwatch includes a primary physical display plane and the supplemental physical display plane(s). The supplemental physical display plane(s) at least partially surround the primary physical display plane. The method displays primary content on the primary physical display plane and supplemental content on the virtual display plane(s). The method also receives touch sensor input from a touch sensor of the smartwatch and maps the touch sensor input to interface element(s) of the supplemental content on the virtual display plane(s). The method selects the interface element(s) based on the mapping the touch sensor input to the interface element.

Further, a computer program product including a computer readable storage medium readable by a processor and storing instructions for execution by the processor is provided for performing a method. The method establishes, on supplemental physical display plane(s) of a smartwatch wearable mobile device, virtual display plane(s). The smartwatch includes a primary physical display plane and the supplemental physical display plane(s). The supplemental physical display plane(s) at least partially surround the primary physical display plane. The method displays primary content on the primary physical display plane and supplemental content on the virtual display plane(s). The method also receives touch sensor input from a touch sensor of the smartwatch and maps the touch sensor input to interface element(s) of the supplemental content on the virtual display plane(s). The method selects the interface element(s) based on the mapping the touch sensor input to the interface element.

Yet further, a computer system is provided that includes a memory and a processor in communications with the memory, wherein the computer system is configured to perform a method. The method establishes, on supplemental physical display plane(s) of a smartwatch wearable mobile device, virtual display plane(s). The smartwatch includes a primary physical display plane and the supplemental physical display plane(s). The supplemental physical display plane(s) at least partially surround the primary physical display plane. The method displays primary content on the primary physical display plane and supplemental content on the virtual display plane(s). The method also receives touch sensor input from a touch sensor of the smartwatch and maps the touch sensor input to interface element(s) of the supplemental content on the virtual display plane(s). The method selects the interface element(s) based on the mapping the touch sensor input to the interface element.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
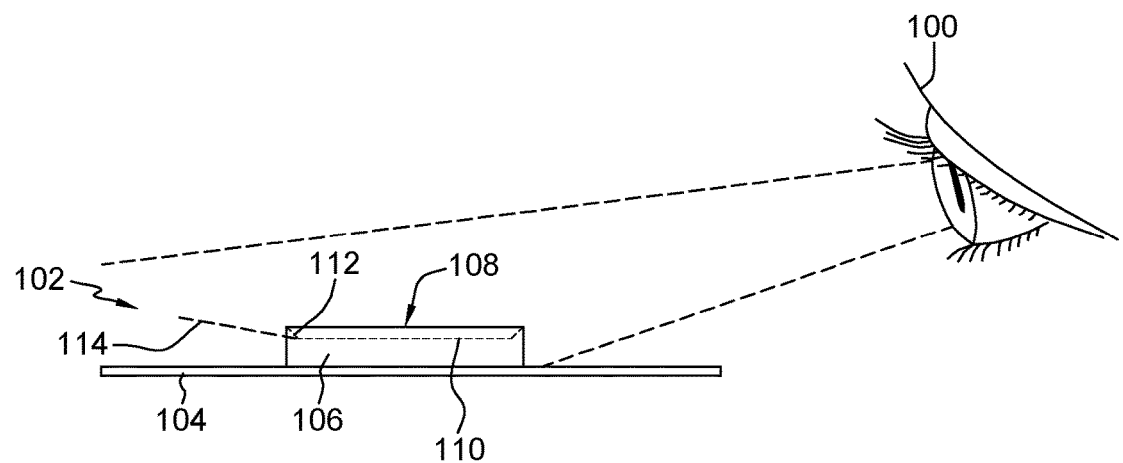
FIGS. 1A-1C depict an example of a wearable mobile device in accordance with aspect described herein.

Keying-in letters, words, and other input may be necessary to effectively interact with a mobile device, such as a wearable mobile device. While speech-to-text is sometimes used as a viable option for acquiring user input, the ability to key-in of text in response to different tasks in some wearables may be indispensable. Described herein are extensions to wearable and other mobile devices via a virtual extension of the screen (also referred to here as the 'physical display' or just 'display'). Certain interface elements may be presented on a virtual display plane rendered on a supplemental physical display of the mobile device, while other content is presented on a primary physical display. Using the keyboard example, the keyboard or elements (keys, suggested characters or words, etc.) thereof may be presented on virtual display plane(s) rendered on supplemental physical display(s) of the mobile device, while primary content, such as a form, document, or other digital entity, is presented on the primary physical display.

In some aspects, a new format for a keyboard is provided where the user physically interacts with a touch device remote from the supplemental physical display that displays a virtual keyboard, and/or the user interacts with interface elements in a portion of the supplemental physical display plane(s) that correspond to other interface elements (e.g. letters) in another portion of the supplemental display plane(s).

Physical display plane(s), i.e. supplemental physical display plane(s), can form a partial or full ring/strip around a primary physical display of the mobile device. The supplemental physical display planes form the virtual display area to be used to house virtual display plane9s) and other supplemental content. One purpose of the ring display area may be to create a virtual extended display area as described herein. In some examples, the supplemental physical display plane(s) are separate physical display devices from the primary physical display plane, that is different physical displays form the primary and supplemental display planes. Additionally or alternatively, a single flexible display can be bent or flexed to define and form separate display planes (i.e. on each side of the bend). The 'ring' portion including the supplemental physical display plane(s) may be of any thickness, e.g. extending away from the primary display device as explained with reference to FIG. 1, and may depend on the overall display dimension of the mobile device and dimension to be dedicated to the supplemental display plane(s). The ring display area can be fixed in an angular way relative to the primary display plane (e.g. watch face), to create a proximate alignment with the user's viewing angle.

Once the virtual display area is established in the mobile device, it can be mapped with a touch sensor of the mobile device. In the example of a smartwatch, the touch sensor may be built into a specific area of the watch band (also referred to as a watch belt or watch strap). A user could perform a finger gesture against the watch band and view a corresponding impression of the touch point9s) in the virtual display area.

A virtual keyboard may be displayed in the virtual display area, and the user can interact with the virtual keyboard without interacting specifically with the physical display of the smartwatch.

The ring display area may be fixed in terms of its dimension, and may extend from the primary display area in multiple directions, so that supplemental content can be visible from multiple direction. in some embodiment, the user can control the virtual display area position with a configurable menu. Based on a viewing direction of the user, software can dynamically identify a position for a virtual display plane for displaying supplemental content in the virtual display area.

In further enhancements, a smartwatch has multiple display layers, with a top display layer being a transparent 'outer' display, and bottom display layer being an underlying display having the ring display area and primary physical display area mentioned above. The outer transparent display in some examples is, or is incorporated into, the face of the smartwatch and initially display content. When supplemental content, such as a virtual keyboard is not required, the user can view the initially displayed content on the transparent outer display. Then based on invoking a supplemental display plane, such as when a virtual keyboard is desired, content may be displayed in the bottom layer including the primary physical display and supplemental physical displays underlying the transparent outer display.

The virtual keyboard can group keys (e.g. representing discrete characters, letters, symbols, etc.) into groups. An example such grouping of lowercase letters of the modern English alphabet is as follows:

Group 1: c, k, g, j, t, d, p, f, b, q, w, x, z
Group 2: h, l, r, s, v, m, n
Group 3 (vowels): a, e, i, o, u Various examples provided herein are described with reference to smartwatch wearable devices, though described aspects can apply to any suitable wearable device, or mobile device generally.

Figure 1B:
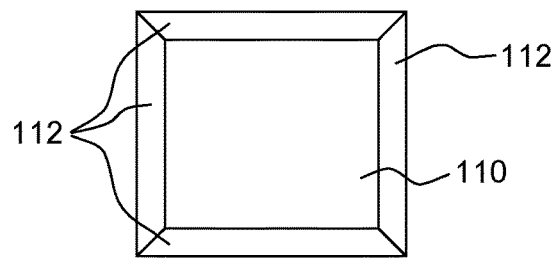
Figure 1C:
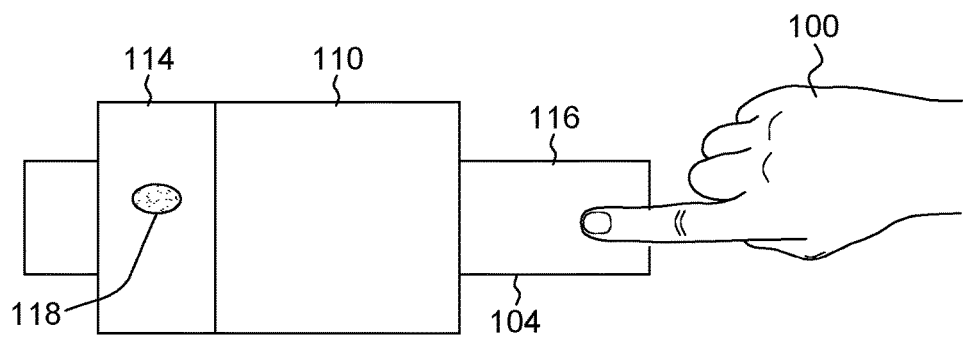

FIGS. 1A-1B depict an example of a wearable mobile device in accordance with aspect described herein. The example wearable in FIGS. 1A-1C is a smartwatch. A user wearing a smartwatch views the face of the smartwatch from any of various angles. It is not uncommon to view the watch from an angle other than perpendicular to the watch face.

In FIG. 1A, a side view is presented of a user/viewer 100 viewing smartwatch 102 from an example angle, with the user's viewing direction shown in dashed lines originating from the viewer's eye. Smartwatch 102 includes a watch band 104 and watch body 106. The watch body has a face 108, which may be a substantially flat or slightly curved face, as examples. The face may be made of any suitable material, examples of which are a transparent material, such as glass and/or a transparent display. Smartwatch 102 also includes a physical display device, as is known, or more than one physical display device, which form substantially flat plane(s) for presentation of information visual form. Example technologies on which a physical display of a wearable device may be based include liquid crystal display (LCD), light emitting diode (LED), organic light emitting diode (OLED), as examples. In the example of FIG. 1A, smartwatch 102 includes a primary physical display plane 110 and supplemental physical display planes 112. As shown, the display planes 112 are shown oriented at an angle relative to primary display plane 110, which itself is oriented parallel or near parallel to watch face 108. In this particular example, the watch face may be made of transparent glass, with primary physical display plane 110 underlying the glass, and supplemental physical display planes 112 extending angularly between the primary display plane 110 and the watch face 108 toward the edges of watch body 106.

In one example, each display plane 110, 112 is formed by a discrete, separate display device. In other examples, one or more of the display planes 110, 112 are formed by a single display device that is flexible. In this manner, a flexible display device can be flexed/bend to form discrete display planes. For instance, a single flexible display device may form display planes 110 and 112 in FIG. 1A.

FIG. 1B shows an isolated top view of the display device configuration of smartwatch 102. The supplemental physical display plane(s) 112 can at least partially surround the primary display plane 110. In this example, there are four supplemental physical display planes 112 that surround primary physical display plane 110. The supplemental physical display planes 112 are oriented at an angle extending from the edges of the primary physical display plane 110, forming a tray-like configuration.

The supplemental physical display planes 112 form a ring-like display area around the primary display area/plane 110. This ring display area may be used to create a virtual display area to show, e.g., virtual display plane(s). A virtual display plane may be programmatically created on a supplemental physical display plane and display content. It can be presented with a skew to create the impression of depth, i.e. extending into the physical display plane. The virtual display planes are configurable so that their location in the supplemental display planes(s), their direction and extent of skew, and any other pertinent properties can be selected (automatically in some examples) based on the user's particular viewing direction to the smartwatch. FIG. 1A shows an example virtual display plane 114 as dashed line. It is oriented at an angle with respect to a surface of the physical plane 112. When the viewer views the smartwatch from the direction depicted in FIG. 1A, the user can look at supplemental display plane 112 at the opposite side of the smartwatch. The supplemental physical display plane 112 is itself relatively small in physical dimension compared to the primary physical display 110, however the virtual display plane 114 constructed and presented as indicated by the dashed line in FIG. 1A virtually presents an extended display area as a surface appearing much larger than the physical dimensions of the supplemental physical display plane 112.

FIG. 1C shows another top view of smartwatch 102, simplified and isolated to show relative dimensions and positioning of the primary physical display plane 110 and the virtual display plane 114 presented on a single (in this case) supplemental physical display plane 112. FIG. 1C depicts how the virtual display plane 114 is shown in the smartwatch. The ring display area (supplemental physical display plane 112) creates the virtual display plane 114. The virtual display plane 114 can display supplemental content, such as a virtual keyboard.

Shown also is the watch band 104, which includes a touch sensor 116 built into a portion of the watch band. The created virtual display plane can be mapped with a predefined area in the watch belt, e.g. the area where the touch sensor 116 resides in the watch belt. The watch band has a touch sensor 116 installed. In one example, the surface of the band is or includes a touch-sensitive touchpad part/capacitive sensor(s) to sense touch. When the user 100 touches in this area as shown in FIG. 1C, the relative position of the touch can be shown in the virtual display plane 114, in this example by a touch point impression 118. The touch point impression 118 is shown in a position corresponding to the position that user 100 touches on the touch sensor. If the user moves his/her finger or touches a different portion of the touch sensor, the touch point impression 118 can be repositioned accordingly. In some example, the touch sensor support multi-touch in which case multiple impressions 118 may be shown. The impression(s) 118 may be highlighting or transparent shading as examples that 'overlay' supplemental content being displayed on the virtual display plane, enabling the viewer/user to see the underlying supplemental content.

In the case of a virtual keyboard being displayed on the virtual display plane, the user may interact with the keyboard via the touch sensor(s) of the watch band. As noted, the user can also view the touch point impression in the virtual display plane, so that the user sees the content (e.g. character) currently highlighted for selection. Any of various actions by the user can select the content that the impression highlight, for instance a voice command, or a tap or multi-tap on the touch sensor.

Additionally, the touch sensor can also be configured to detect gestures that supply input to the device, for instance gestures to effect more complex actions, like enabling or disabling the supplemental display plane(s). Also, although the touch sensor 116 is show incorporated into the watch band, a touch sensor could additionally or alternatively be a separate wireless peripheral device paired or in other communication with the smartwatch.

Referring to FIG. 1A, the smartwatch may have multiple display layers. A top display layer, such as one formed on or at the watch face 108, may be a transparent 'outer' display. This may overlay a bottom display having the ring display area and primary physical display area (108, 110). In FIG. 1A, at least portions of these layers may be spaced apart by a transparent material such as glass or plastic. When supplemental content, such as a virtual keyboard is not required, the user can view the initially displayed content on the transparent outer display. This transparent outer display and the underlying display may be switched between for displaying content: Content is initially displayed on the transparent outer display, then based on an invocation of the supplemental physical display plane(s), such as when a virtual keyboard is desired or a user views particular primary content, software may deactivate display of the content on the transparent outer display and activate the underlying display to establish virtual display plane(s) on supplemental physical display plane(s) and the display primary content on the primary physical display plane and supplemental content on the virtual display plane(s). The primary and supplemental content may be visible through the transparent outer display, which has been deactivated (e.g. content is temporarily no longer being displayed thereon).

Figure 2:
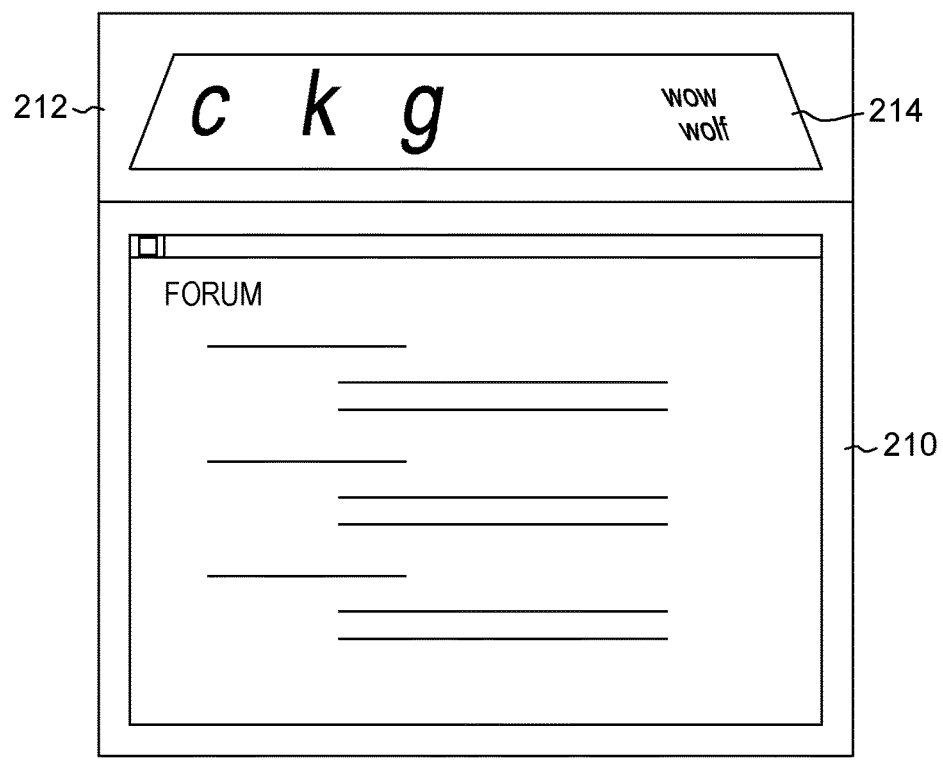
FIG. 2 illustrates an example showing primary and supplemental physical display planes, with a virtual display plane depicted on the supplemental physical display plane, in accordance with aspects described herein.

FIG. 2 illustrates an example showing primary and supplemental physical display planes, with a virtual display plane depicted on the supplemental physical display plane, in accordance with aspects described herein. Primary physical display plane 210 displays primary content, in this case a web page showing a web forum. The supplemental physical display plane 212 is also shown with a relative size of about ⅓ of the size of primary physical display plane 210. In other embodiments, the size of the supplemental physical display plane will be smaller or larger relative to the size of the primary physical display plane. Virtual display plane 214 is established on the supplemental physical display plane 212 as shown. The plane is outlined using solid lines to show a skew to the virtual display plane. Skewing the virtual display plane gives it a three-dimensional appearance. The supplemental content displayed 'on the virtual display plane' is content presented in the area of the virtual display plane. In this example the supplemental content includes characters of a virtual keyboard, and two suggested words. The keyboard may be used to make a post on the web forum displayed on the primary display plane, without a keyboard or other input interface consuming space on the primary display plane. In FIG. 2 the supplemental content is presented with the skew in an angular direction/distance away from the user. In some embodiments, the virtual display plane is not delineated or viewable to the viewer; it is shown in FIG. 2 to illustrate the skew that may be imparted to supplemental content in order to create the impression of a more extensive display area than afforded by the physical dimensions of the supplemental display plane.

Implementation of a virtual keyboard in accordance with aspects described herein is now described. The supplemental physical display area can include four supplemental display planes oriented around a primary display. FIG. 1B shows such a configuration. The four supplemental physical display planes are referred to as a top, bottom, right, and left supplemental physical display planes. Characters of an alphabet may be shown in an area of the top supplemental plane. Based on the linguistic forms, a right-most portion of the area may be for designated characters (such as vowels), with the left and center most portions of the area being for other characters (such as consonants). If the user selects a vowel first, then the area may be used only for consonants. If the next character that the user wants to type is a vowel, the user can select an edge (e.g. Edge 1, selecting in the right supplemental plane) by selecting on the corresponding position of the touch sensor to cause the smartwatch to change what characters are displayed in the area in the top supplemental display plane. If the presented consonants do not include the user's next desired character, the user can swipe across (e.g. by using the touch sensor to perform a gesture of swiping left-to-right or right-to-left). A next set or group of consonants may then be presented in the top supplemental plane. Additionally or alternatively, the user may be able to scroll through a list or sequence of elements (characters, words etc.) e.g. by pressing and holding on the touch sensor at a position corresponding to an edge of the supplemental display plane (e.g. Edge2, the left supplemental plane, opposite to Edge1). In the case of a consonant list, the consonant lists could scroll to display other consonants in the top supplemental display. Scrolling may advantageously help the user to avoid continuous swiping.

The characters may be grouped, and the scrolling may scroll group-to-group. A group may include only all vowels of the alphabet; for instance Group 3 could be a vowel group. An example such grouping of lowercase letters of the modern English alphabet is as follows: Group 1: c, k, g, j, t, d, p, f, b, q, w, x, z; Group 2: h, l, r, s, v, m, n; Group 3 (vowels): a, e, i, o, u.

In a particular example: The Group 1 consonants, Group 2 consonants and Group 3 vowels are shown in the supplemental display in an embodiment. In another embodiment, only the lower supplemental display is used where the Group 1, Group 2, and Group 3 items are displayed for selection. If a Group 1 character is selected as the first consonant, the consonant may be displayed in the display area on the top supplemental display plane with preselected, suggested words (e.g. based on from prior usage for instance), and the user can use the lower supplemental display plane to select a suggested word if applicable or a vowel from Group 3 that is currently displayed, or select the Group 2 to display the Group 2 consonants. If a suggested word is selected, then the preceding is repeated to input the next word, if necessary. If a vowel is selected from Group 3 as a next letter in the word being typed, then the above is repeated (the partial word is displayed on the top supplemental display plane, suggested word(s) show, and additional character selection may be performed). If in entering a next character a selection of a different Group (say Group 2) is made—which indicates that the next character is different from the ones of the Group being presented—then the suggested words may be updated (e.g. using what is typed of the partial word together with possible combinations with the new selected Group's characters), and the other Group's characters are shown for possible selection. The user makes the next selection—a suggested word, a Group 2 (in this example) consonant, or a switch to Group 3's items, and the foregoing repeats to complete the word building. This all maybe repeated to form sentence(s).

In some embodiments, a space character may be shown every nth (e.g. 4th) character, and this property may be user configurable.

Figure 3:
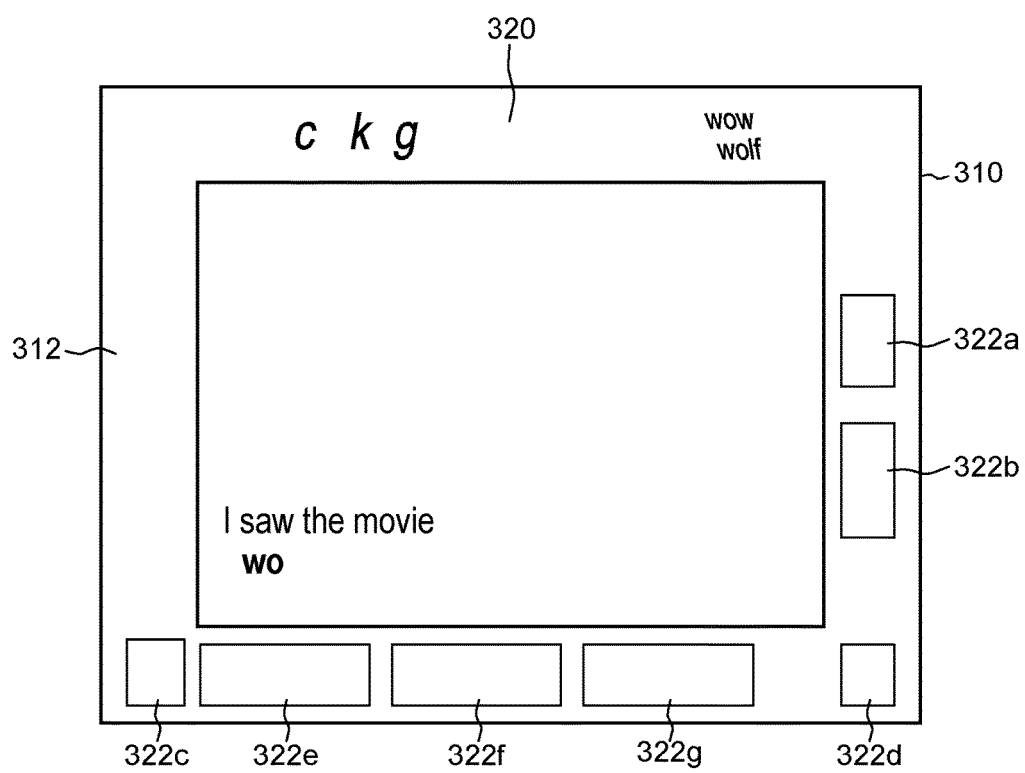
FIG. 3 illustrates another example showing primary and supplemental physical display planes, and interface elements corresponding to a virtual keyboard presented as supplemental content, in accordance with aspects described herein.

FIG. 3 illustrates another example showing primary and supplemental physical display planes, and interface elements corresponding to a virtual keyboard presented as supplemental content, in accordance with aspects described herein.

FIG. 3 shows the smartwatch face with the supplemental display plane(s) flattened for illustrative purposes. Primary physical display plane 310 displays primary content which in this case is an ongoing chat (such as a text message). The user has typed "I saw the movie" and is now following that with a next word beginning with the letters 'w', 'o'. Supplemental physical display plane 312 is shown as a single continuous border/ring around the primary physical display plane, though in other examples the border/ring is formed as several supplemental display planes, for instance one at each of the top, bottom, left side, and right side of the primary display plane.

In the top of supplemental physical display plane 312 is shown supplemental content including the set of Group 1 (or subset of a Group) of characters 'c' 'k' 'g'. Also shown are two suggested words 'wow' and 'wolf'. The suggested words may be determined in real time as the user types the letters of a word, and may be determined based on any of various approaches. The system has determined wow and wolf are good suggested words after the user types 'w'-'o'. In one example, the system determines that 'wow' and 'wolf' are words that the user frequently types. Additionally or alternatively, the suggested words may be determined based on context, for instance context of the conversation that the user is having. The user is describing having seen a movie in FIG. 3; a natural next thought for the user to express is the user's impression or reaction to the movie, and hence the word 'wow' may be appropriate.

In some examples, a similar approach is taken to selecting and displaying at least one suggested next character for the word being typed. Based on the user typing 'w'-'o', the system might determine that the next letter is substantially statistically likely to be a 'w'. The 'w' may be presented in the group of characters displayed. A phonetic grouping of the character types may additionally or alternatively be used in selecting which character(s) or word(s) to suggest. Additionally or alternatively the system could determine a next best word set that is likely to contain the desired word, and suggest next letter(s) and/or word(s) for the user to quickly select.

Referring back to FIG. 3, in this example various other interface elements displayed include virtual key interface elements (labeled 322a through 322g). Elements 322a and 322b correspond to the 'slots' holding the suggested words—'wow' and 'wolf' in this example—respectively. For instance selection of element 322a selects the word wow, which in this example of the user typing a word would complete the word to read "wow" for sending as part of this conversation.

Elements 322e, 322f, and 322g are interface elements that correspond respectively to the letters in the left ('c'), center ('k'), and right ('g') positions in the top portion of supplemental physical display plane 312. For instance selection of element 322e would input the character 'c'. Elements 322c and 322d scroll left and right, respectively, through the characters presented in the top of the supplemental physical display plane 312. Selecting 322c would scroll 'c' 'k' 'g' to left to hide at least the 'c' character and reveal one or more additional character(s) from the right side. IN one embodiment, the scrolling is character-by-character while in other embodiments a single scroll to the right or left would scroll to an entirely new group of characters.

Accordingly, supplemental content may be presented on a virtual display of a mobile device, in accordance with aspects described herein. Supplemental display plane(s) at least partially surround a primary physical display panel, to form a 'ring' display area, e.g. around a smartwatch's primary display plane. The shape and dimension of the ring display area can depend on the dimension of the smartwatch. Generally, the ring display area can have some upper limit in terms of its dimensions so that the overall smartwatch dimension (e.g. thickness) does not exceed a given specification. The supplemental display plane(s) can be made large enough that the virtual display planes can be created and visible from a specified viewing angle range.

The supplemental display plane(s) can be fixed angularly with respect to the primary display plane, angled to align with a viewing angle range of users. A touch sensor may be installed in a specified area within the belt/band of the smartwatch. This touch area can then be mapped with the content in the created virtual display plane(s). Software can analyze the viewing direction of the user and control the direction and location where the smartwatch positions the virtual display plane(s).

Once the virtual area is displayed, the user can touch the touch sensor of the watch band and select interface elements presented as the supplemental content. Keyboard, menu options, and any other desired content that might otherwise be displayed on the primary display plane can instead be displayed in the virtual display area. The selection of which content to present on the supplemental display plane(s) may be configurable, for instance by a user of the device, the device manufacturer, the software or app developer of the content being shown, etc.

A relative touch point impression can be shown in the virtual area so that user can view the user's interactions with the menu, keyboard, or other supplemental content presented in the supplemental display plane(s), for instance to perform selections and gesture using/on the appropriate area of the watch band.

Accordingly, aspects described herein involve virtual display area(s) where a virtual keyboard can be shown, the user can type/select content using a touch sensor incorporated into another portion of the wearable device (e.g. belt of the smartwatch) and there need not be a visual obstacle to the primary display area (such as with holographic keyboards).

Figure 4:
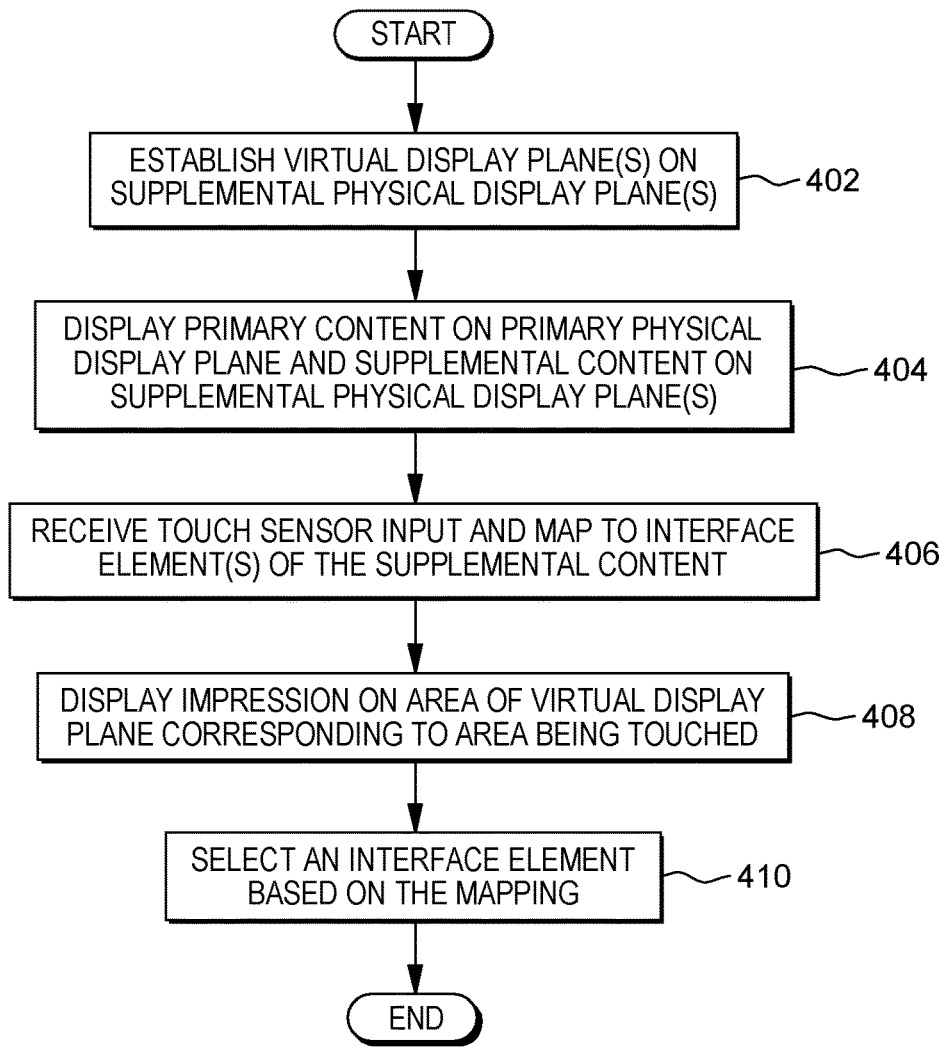
FIG. 4 depicts an example process for display of supplemental content on a smartwatch wearable mobile device, in accordance with aspects described herein.

FIG. 4 depicts an example process for display of supplemental content on a smartwatch wearable mobile device, in accordance with aspects described herein. In some examples, the process is performed by one or more computer systems, such as those described herein, which may include a mobile device such as a smartwatch wearable mobile device.

The process begins by establishing, on at least one supplemental physical display plane of a smartwatch wearable mobile device, at least one virtual display plane (402). The smartwatch can include a primary physical display plane and the at least one supplemental physical display plane. The at least one supplemental physical display plane can at least partially surround the primary physical display plane. In some cases, such as with a round smartwatch face, there may be a single supplemental display plane surrounding a primary display plane in a ring-like configuration. Establishing the at least one virtual display plane can include establishing, on one supplemental physical display plane of the at least one supplemental physical display plane, one virtual display plane of the at least virtual display plane with a skew by orienting the one virtual display plane at an angle with respect to the one supplemental physical display plane. The skew can impart a three-dimensional appearance to the one virtual display plane on the one supplemental physical display plane. It is noted that the virtual display plane need not be highlighted, delineated, or visually indicated to a user; it may form the skewed 'virtual plane' on which visible interface elements are virtually displayed for the user.

The primary physical display plane and the at least one supplemental physical display plane can be part of a single flexible display, with the single flexible display being bent and forming the primary physical display plane and the at least one supplemental physical display plane. Alternatively, the primary physical display plane and the at least one supplemental physical display plane may be different physical display devices, each supplemental physical display plane of the at least one supplemental physical display plane being oriented at an angle with respect to the physical display plane.

The process of FIG. 4 continues by displaying primary content on the primary physical display plane and supplemental content on the at least one virtual display plane of the at least one supplemental physical display plane (404). The supplemental content can include any desired content, such as menu options corresponding to the primary content on the primary physical display plane.

The process continues by receiving touch sensor input from a touch sensor of the smartwatch and mapping the touch sensor input to at least one interface element of the supplemental content on the at least one virtual display plane (406). The mapping may be programmatic and based on, for instance, the location of the touch sensor that the user touches. The smartwatch can include a watch band and the touch sensor may be built into a portion of the watch band.

Based on receiving the touch sensor input, the process displays a touch point impression on an area of the at least one virtual display plane (408). The area of the at least one virtual display plane can correspond to an area of the touch sensor being touched. The process then selects (410) the at least one interface element based on the mapping the touch sensor input to the interface element. That is, based on the touch sensor input being mapped to the particular interface element, the interface element is selected, which might include selecting a character for input, a button, option, or the like.

In some embodiments, displaying the supplemental content includes displaying a virtual keyboard on the at least one virtual display plane, and the receiving the touch sensor input includes receiving multiple selections of multiple interface elements corresponding to alphabetic characters of the virtual keyboard, where the multiple selections form one or more words. That is, the receiving, displaying, and selecting (406-410) of FIG. 4 is repeated to, e.g., type the words.

The displaying the virtual keyboard can include grouping characters of an alphabet into a plurality of groups, displaying a group of characters, of the plurality of groups, on one virtual display plane of the at least one virtual display plane, and establishing a plurality of virtual key interface elements on one or more other virtual display planes of the at least one virtual display plane. Some virtual key interface elements of the plurality of virtual key interface elements can correspond to characters in the group of characters, and other virtual key interface elements of the plurality of virtual key interface elements corresponding to a scrolling action to scroll through the plurality of groups.

The displaying the supplemental content can further include displaying suggested words. The suggested words may be based on one or more characters typed on the virtual keyboard. The displaying can also include displaying a respective virtual key interface element to select each word of the suggested words.

The displaying the supplemental content can further include selecting and displaying, based on one or more characters typed on the virtual keyboard to form a portion of a word, at least one suggested next character for the word. The selecting in this regard may be based further on (i) a phonetic grouping of the one or more characters typed on the virtual keyboard, (ii) a determined next best word set for the word, (iii) a combination of (i) and (ii), or (iv) any desired approach.

The smartwatch can include a transparent outer display that overlays an underlying display. The primary physical display plane and the at least one supplemental physical display plane may be part of the underlying display, where a process can further include switching between the transparent outer display and the underlying display for displaying content. The switching can include initially displaying content on the transparent outer display, based on an invocation of the at least one supplemental physical display plane, deactivating display of the content on the transparent outer display, and activating the underlying display by performing the establishing of the at least one virtual display plane on the at least one supplemental physical display plane and the displaying primary content on the primary physical display plane and supplemental content on the at least one virtual display plane. The primary and supplemental content may be visible through the transparent outer display in these examples.

Although various examples are provided, variations are possible without departing from a spirit of the claimed aspects.

Figure 5:
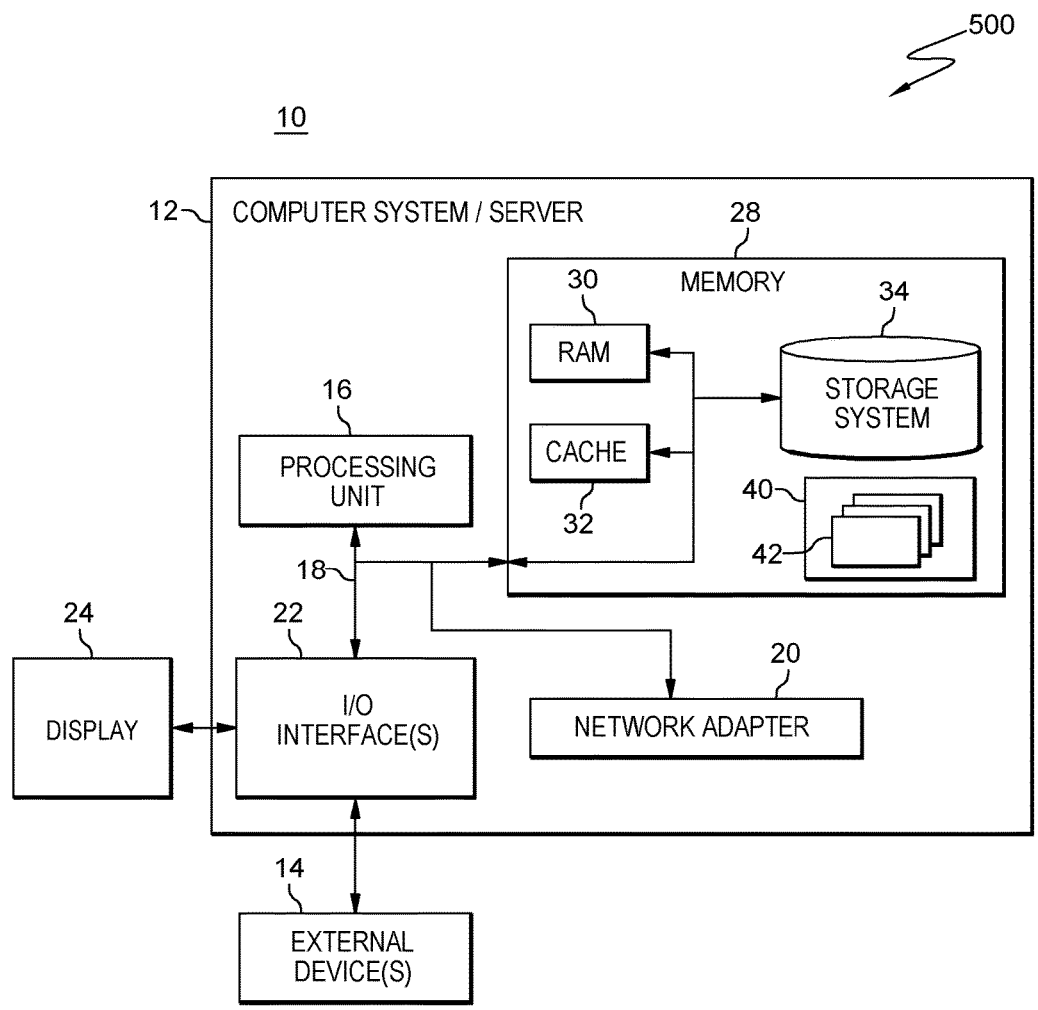
FIG. 5 depicts one example of a computer system and associated devices to incorporate and/or use aspects described herein.

Processes described herein may be performed singly or collectively by one or more computer systems, such as one or more smart or mobile devices, such as a smartwatch wearable device, or a combination of the foregoing. FIG. 5 depicts one example of such a computer system and associated devices to incorporate and/or use aspects described herein. A computer system may also be referred to herein as a data processing device/system or computing device/system/node, or simply a computer. The computer system may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

As shown in FIG. 5, a computing environment 500 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, workstations, laptops, handheld devices, mobile devices/computers such as smartphones, tablets, and wearable devices, multiprocessor systems, microprocessor-based systems, telephony device, network appliance (such as an edge appliance), virtualization device, storage controller set top boxes, programmable consumer electronics, smart devices, intelligent home devices, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media such as erasable programmable read-only memory (EPROM or Flash memory). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more computer application programs, other program modules, and program data. Computer programs may execute to perform aspects described herein. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Input/Output (I/O) devices (including but not limited to microphones, speakers, accelerometers, gyroscopes, magnetometers, sensor devices configured to sense touch, light, ambient temperature, levels of material), activity monitors, GPS devices, cameras, etc.) may be coupled to the system either directly or through I/O interfaces 22. Still yet, computer system/server 12 may be able to communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter(s) may also enable the computer system to become coupled to other computer systems, storage devices, or the like through intervening private or public networks. Ethernet-based (such as Wi-Fi) interfaces and Bluetooth® adapters are just examples of the currently available types of network adapters used in computer systems.

It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
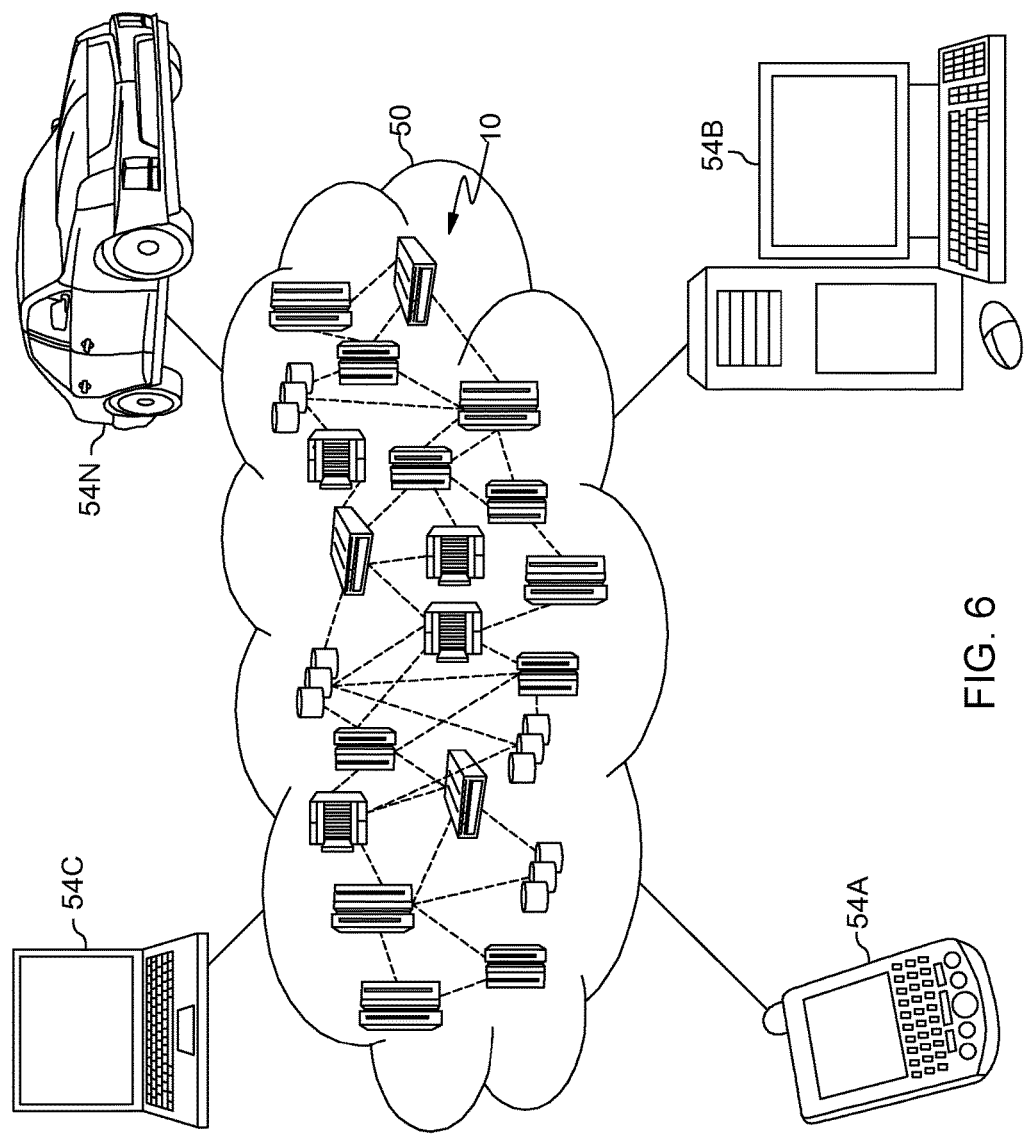
FIG. 6 depicts one embodiment of a cloud computing environment.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
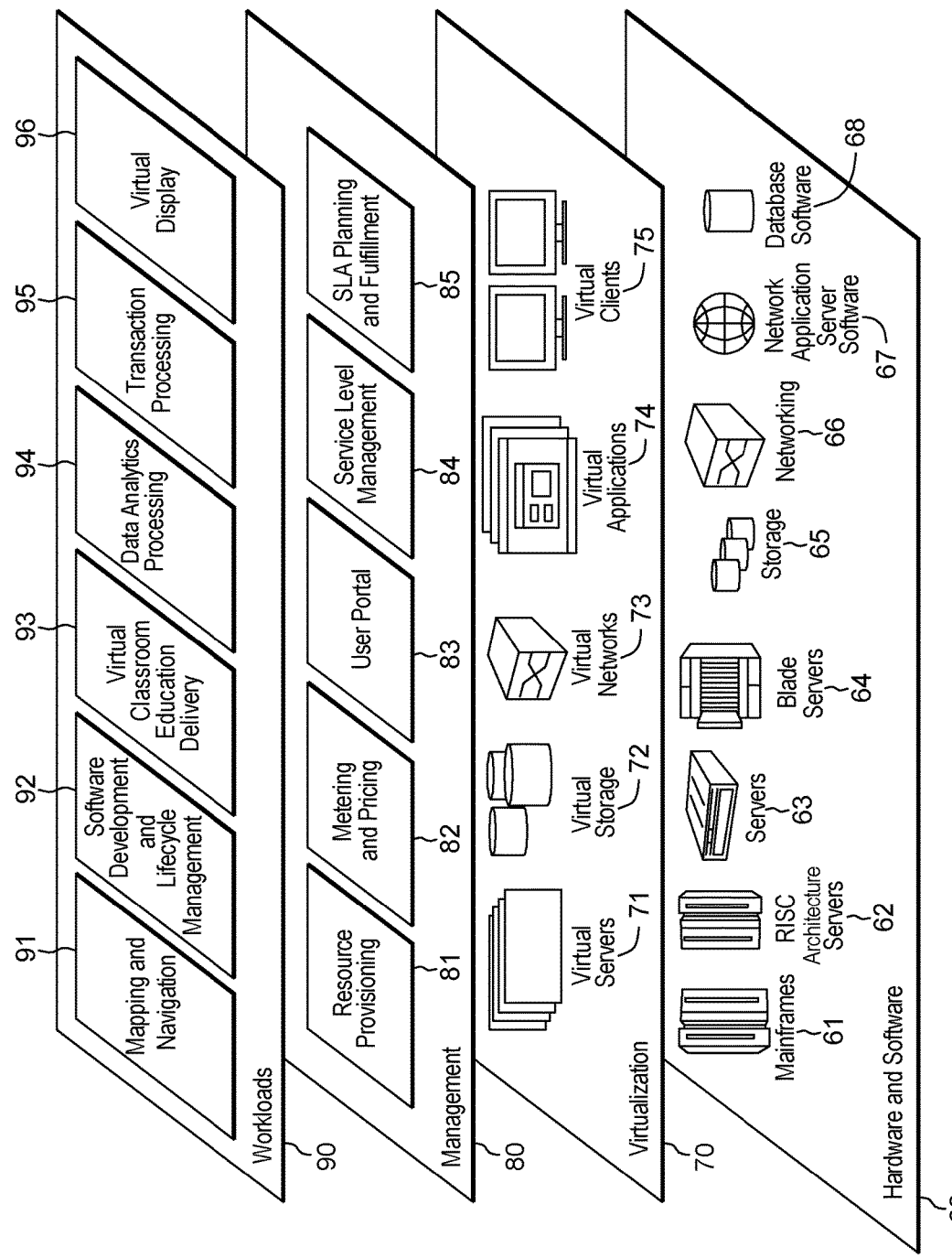
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual display 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

establishing, on at least one supplemental physical display plane of a smartwatch wearable mobile device, a plurality of virtual display planes, the plurality of virtual display planes being different from each other, the smartwatch comprising a primary physical display plane and the at least one supplemental physical display plane, the at least one supplemental physical display plane at least partially surrounding the primary physical display plane, wherein the primary physical display plane and the at least one supplemental physical display plane are different physical display devices, each supplemental physical display plane of the at least one supplemental physical display plane being oriented at an angle with respect to the primary physical display plane;

concurrently displaying primary content on the primary physical display plane and supplemental content on the plurality of virtual display planes of the at least one supplemental physical display plane, wherein the displaying the supplemental content comprises displaying a virtual keyboard on the plurality of virtual display planes, wherein the displaying the virtual keyboard comprises:

grouping characters of an alphabet into a plurality of groups;

displaying a group of characters, of the plurality of groups, on a first one or more virtual display planes of the plurality of virtual display planes; and establishing a plurality of virtual key interface elements on a second one or more virtual display planes of the plurality of virtual display planes, the first one or more virtual display planes being different from the second one or more virtual display planes, wherein each character of the group of characters is displayed in a respective position, of a plurality of positions, of the first one or more virtual display planes, the respective position corresponding to a respective virtual key interface element of a first group of virtual key interface elements of the plurality of virtual key interface elements such that selection of the respective virtual key interface element selects for input the character, of the group of characters, displayed in that position, wherein other virtual key interface elements of the plurality of virtual key interface elements established on the second one or more virtual display planes correspond to a scrolling action to scroll through, on the first one or more virtual display planes of the plurality of virtual display planes, the plurality of groups, wherein scrolling through the plurality of groups to scroll to another group of the plurality of groups displays each character of the other group in a respective position of the plurality of positions, wherein selection of the virtual key interface element corresponding to the respective position selects for input the character, of the other group of characters, displayed in that position;

receiving touch sensor input from a touch sensor of the smartwatch and mapping the touch sensor input to at least one interface element of the supplemental content on the plurality of virtual display planes, wherein the smartwatch comprises a watch band and the touch sensor is built into a portion of the watch band, and wherein the receiving the touch sensor input comprises receiving multiple selections of multiple interface elements corresponding to alphabetic characters of the virtual keyboard, the multiple selections forming one or more words; and selecting the at least one interface element based on the mapping the touch sensor input to the interface element.

2. The method of claim 1, further comprising: based on receiving the touch sensor input, displaying a touch point impression on an area of at least one virtual display plane of the plurality of virtual display planes, the area of the at least one virtual display plane corresponding to an area of the touch sensor being touched.

3. The method of claim 1, wherein the displaying the supplemental content further comprises displaying suggested words on a virtual display plane of the plurality of virtual display planes, based on one or more characters typed on the virtual keyboard, and establishing, on at least one other virtual display plane of the plurality of virtual display planes, and for each of the suggested words, a respective virtual key interface element to select for input the word of the suggested words.

4. The method of claim 3, wherein the displaying the supplemental content further comprises selecting and displaying, based on one or more characters typed on the virtual keyboard to form a portion of a word, at least one suggested next character for the word.

5. The method of claim 4, wherein the selecting is based further on at least one selected from the group consisting of: (i) a phonetic grouping of the one or more characters typed on the virtual keyboard, and (ii) a determined next best word set for the word.

6. The method of claim 1, wherein establishing the plurality of virtual display planes comprises establishing, on one supplemental physical display plane of the at least one supplemental physical display plane, one virtual display plane of the plurality of virtual display planes with a skew by orienting the one virtual display plane at an angle with respect to the one supplemental physical display plane, the skew imparting a three-dimensional appearance to the one virtual display plane on the one supplemental physical display plane.

7. The method of claim 6, further comprising detecting a viewing direction of a user of the smartwatch, the viewing direction being a direction of view to the one supplemental physical display plane, wherein the establishing the one virtual display plane on the one supplemental physical display plane selects the skew based on the detected viewing direction to facilitate viewability of supplemental content displaying on the one supplemental physical display plane.

8. The method of claim 1, wherein the smartwatch comprises a transparent outer display that overlays an underlying display, the primary physical display plane and the at least one supplemental physical display plane being part of the underlying display, wherein the method further comprises switching between the transparent outer display and the underlying display for displaying content, the switching comprising:

initially displaying content on the transparent outer display;

based on an invocation of the at least one supplemental physical display plane, deactivating display of the content on the transparent outer display; and activating the underlying display by performing the establishing of the plurality of virtual display planes on the at least one supplemental physical display plane and the displaying primary content on the primary physical display plane and supplemental content on the plurality of virtual display planes, wherein the primary and supplemental content is visible through the transparent outer display.

9. The method of claim 1, wherein the supplemental content comprises menu options corresponding to the primary content on the primary physical display plane.

10. A computer system comprising:

a memory; and a processor in communication with the memory, wherein the computer system is configured to perform a method comprising:

establishing, on at least one supplemental physical display plane of a smartwatch wearable mobile device, a plurality of virtual display planes, the plurality of virtual display planes being different from each other, the smartwatch comprising a primary physical display plane and the at least one supplemental physical display plane, the at least one supplemental physical display plane at least partially surrounding the primary physical display plane, wherein the primary physical display plane and the at least one supplemental physical display plane are different physical display devices, each supplemental physical display plane of the at least one supplemental physical display plane being oriented at an angle with respect to the primary physical display plane;

concurrently displaying primary content on the primary physical display plane and supplemental content on the plurality of virtual display planes of the at least one supplemental physical display plane, wherein the displaying the supplemental content comprises displaying a virtual keyboard on the plurality of virtual display planes, wherein the displaying the virtual keyboard comprises:

grouping characters of an alphabet into a plurality of groups;

displaying a group of characters, of the plurality of groups, on a first one or more virtual display planes of the plurality of virtual display planes; and establishing a plurality of virtual key interface elements on a second one or more virtual display planes of the plurality of virtual display planes, the first one or more virtual display planes being different from the second one or more virtual display planes, wherein each character of the group of characters is displayed in a respective position, of a plurality of positions, of the first one or more virtual display planes, the respective position corresponding to a respective virtual key interface element of a first group of virtual key interface elements of the plurality of virtual key interface elements such that selection of the respective virtual key interface element selects for input the character, of the group of characters, displayed in that position, wherein other virtual key interface elements of the plurality of virtual key interface elements established on the second one or more virtual display planes correspond to a scrolling action to scroll through, on the first one or more virtual display planes of the plurality of virtual display planes, the plurality of groups, wherein scrolling through the plurality of groups to scroll to another group of the plurality of groups displays each character of the other group in a respective position of the plurality of positions, wherein selection of the virtual key interface element corresponding to the respective position selects for input the character, of the other group of characters, displayed in that position;

receiving touch sensor input from a touch sensor of the smartwatch and mapping the touch sensor input to at least one interface element of the supplemental content on the plurality of virtual display planes, wherein the smartwatch comprises a watch band and the touch sensor is built into a portion of the watch band, and wherein the receiving the touch sensor input comprises receiving multiple selections of multiple interface elements corresponding to alphabetic characters of the virtual keyboard, the multiple selections forming one or more words; and selecting the at least one interface element based on the mapping the touch sensor input to the interface element.

11. The computer system of claim 10, wherein the smartwatch comprises a transparent outer display that overlays an underlying display, the primary physical display plane and the at least one supplemental physical display plane being part of the underlying display, wherein the method further comprises switching between the transparent outer display and the underlying display for displaying content, the switching comprising:

initially displaying content on the transparent outer display;

based on an invocation of the at least one supplemental physical display plane, deactivating display of the content on the transparent outer display; and activating the underlying display by performing the establishing of the plurality of virtual display planes on the at least one supplemental physical display plane and the displaying primary content on the primary physical display plane and d supplemental content on the plurality of virtual display planes, wherein the primary and supplemental content is visible through the transparent outer display.

12. A computer program product comprising:

a computer readable storage medium readable by a processing circuit and storing instructions for execution by the processing circuit for performing a method comprising:

establishing, on at least one supplemental physical display plane of a smartwatch wearable mobile device, a plurality of virtual display planes, the plurality of virtual display planes being different from each other, the smartwatch comprising a primary physical display plane and the at least one supplemental physical display plane, the at least one supplemental physical display plane at least partially surrounding the primary physical display plane, wherein the primary physical display plane and the at least one supplemental physical display plane are different physical display devices, each supplemental physical display plane of the at least one supplemental physical display plane being oriented at an angle with respect to the primary physical display plane;

concurrently displaying primary content on the primary physical display plane and supplemental content on the plurality of virtual display planes of the at least one supplemental physical display plane, wherein the displaying the supplemental content comprises displaying a virtual keyboard on the plurality of virtual display planes, wherein the displaying the virtual keyboard comprises:

grouping characters of an alphabet into a plurality of groups;

displaying a group of characters, of the plurality of groups, on a first one or more virtual display planes of the plurality of virtual display planes; and establishing a plurality of virtual key interface elements on a second one or more virtual display planes of the plurality of virtual display planes, the first one or more virtual display planes being different from the second one or more virtual display planes, wherein each character of the group of characters is displayed in a respective position, of a plurality of positions, of the first one or more virtual display planes, the respective position corresponding to a respective virtual key interface element of a first group of virtual key interface elements of the plurality of virtual key interface elements such that selection of the respective virtual key interface element selects for input the character, of the group of characters, displayed in that position, wherein other virtual key interface elements of the plurality of virtual key interface elements established on the second one or more virtual display planes correspond to a scrolling action to scroll through, on the first one or more virtual display planes of the plurality of virtual display planes, the plurality of groups, wherein scrolling through the plurality of groups to scroll to another group of the plurality of groups displays each character of the other group in a respective position of the plurality of positions, wherein selection of the virtual key interface element corresponding to the respective position selects for input the character, of the other group of characters, displayed in that position;

receiving touch sensor input from a touch sensor of the smartwatch and mapping the touch sensor input to at least one interface element of the supplemental content on the plurality of virtual display planes, wherein the smartwatch comprises a watch band and the touch sensor is built into a portion of the watch band, and wherein the receiving the touch sensor input comprises receiving multiple selections of multiple interface elements corresponding to alphabetic characters of the virtual keyboard, the multiple selections forming one or more words; and selecting the at least one interface element based on the mapping the touch sensor input to the interface element.

13. The computer program product of claim 12, wherein the smartwatch comprises a transparent outer display that overlays an underlying display, the primary physical display plane and the at least one supplemental physical display plane being part of the underlying display, wherein the method further comprises switching between the transparent outer display and the underlying display for displaying content, the switching comprising:

initially displaying content on the transparent outer display;

based on an invocation of the at least one supplemental physical display plane, deactivating display of the content on the transparent outer display; and activating the underlying display by performing the establishing of the plurality of virtual display planes on the at least one supplemental physical display plane and the displaying primary content on the primary physical display plane and supplemental content on the plurality of virtual display planes, wherein the primary and supplemental content is visible through the transparent outer display.

* * * * *